June 25, 1935.  A. E. BRUFFEE  2,006,210
ANTISKIDDING DEVICE
Filed Nov. 26, 1934
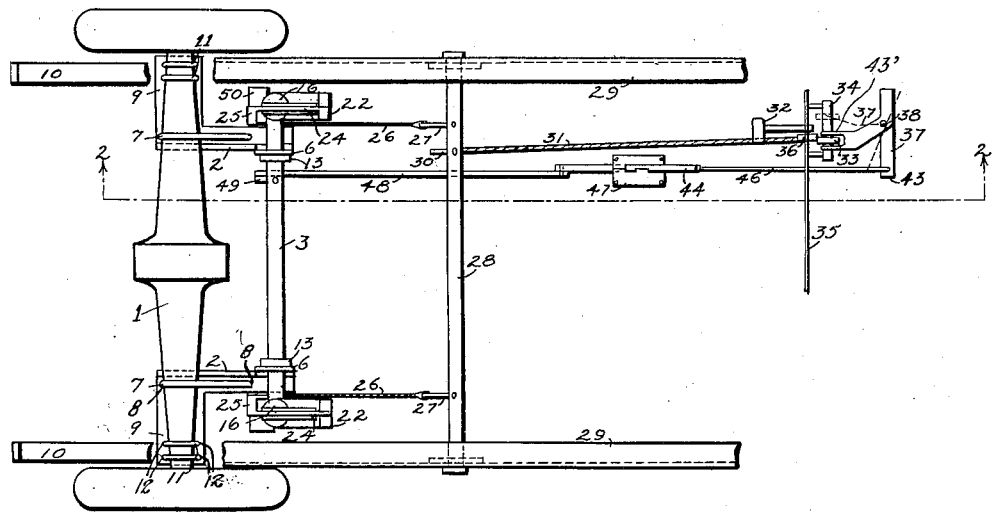
Fig. 1
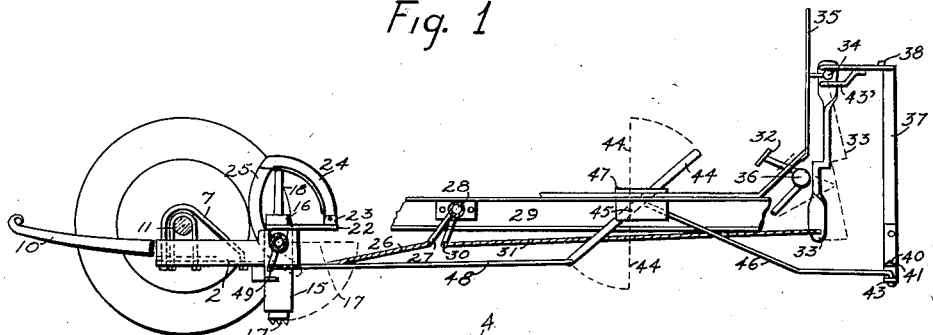
Fig. 2
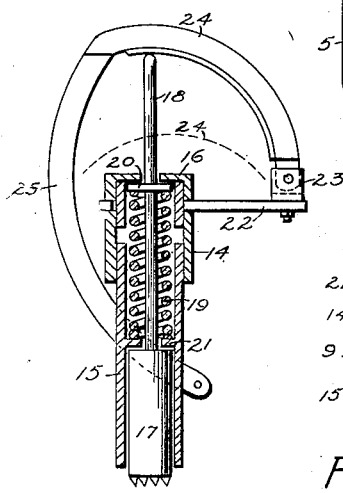
Fig. 4
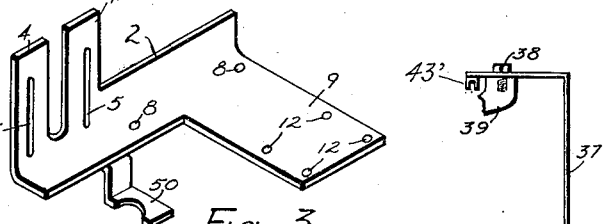
Fig. 3
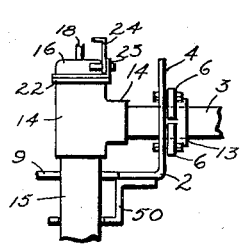
Fig. 5
Fig. 6
Inventor
A. E. Bruffee.
Goldberg
Attorney Patented June 25, 1935

2,006,210

UNITED STATES PATENT OFFICE 2,006,210

ANTISKIDDING DEVICE

Archer Earl Bruffee, Portland, Oreg.

Application November 26, 1934, Serial No. 754,847

1 Claim. (Cl. 188—5)

My invention relates to antiskidding devices, particularly for automobiles, in which vertical plungers are attached to the rear end of an automobile, and pressed into the ground by foot power.

The objects of my invention are to manufacture an antiskidding device which is comparatively simple and inexpensive in construction; which can easily be attached to any automobile; which can be swung out of the way to give full road clearance for normal or summer driving; which can quickly be placed in operative position by the simple release of a hand lever; which is operated by one of the regular foot pedals of the automobile; which can be used as an extra brake; and which provides the automobile driver with an effective safe guard against skidding.

I attain these objects with the mechanism illustrated in the accompanying drawing, in which—

Fig. 1 is a plan view of the entire apparatus, the relevant parts of an automobile being indicated where necessary.

Fig. 2 is a section through Fig. 1 along the line 2—2.

Fig. 3 is a perspective view of the bracket.

Fig. 4 is a detail of the plunger mechanism, part thereof being shown in section.

Fig. 5 illustrates the support of the ice brake in the bracket.

Fig. 6 is a detail of the frame construction.

Similar numerals refer to similar parts throughout the several views.

Securely attached to each end of the rear axle housing 1 of an automobile, is a bracket 2 for the support of the ice brake. The details of the bracket are shown in Figs. 3 and 5. The tubular ice brake shaft 3 rests between the upright lugs 4. The slots 5 in the lugs 4 serve for the reception of the shaft bearing 6, and also permit adjustment for height. A strap 7, which fits into the holes 8 in the bracket 2, clamps the latter to the under side of the rear axle housing 1. An angular extension 9, on the bracket 2, reaches sideways under the automobile spring 10, where the spring shackle bolts 11, fitting into the holes 12 in the bracket 2, help to preserve said bracket 2 in horizontal position.

The ice brake includes the tubular shaft 3 mounted in the bracket 2, and preserved by a collar 13, adjacent to the bearing 6, against side slip. Each end of the tubular shaft 3 carries a T-fitting 14 for the reception of a tubular guide 15. The bottom of said tubular guide 15 is left open, while the top is closed by a perforated cap 16. Projecting from the bottom of the tubular guide 15 is a plunger 17 with a serrated end. A stem 18, integral with the plunger 17, projects through the perforated cap 16. Surrounding the stem 18, within the tubular guide 15, is a helical spring 19, whose upper end presses against a collar 20 on the stem 18, while the lower end of the spring 19 rests on a shoulder 21 in the tubular guide 15, immediately above the plunger 17. Thus, when the stem 18 with its collar 20 and plunger 17 is pressed down, the spring 19 will restore these elements to their normal position as soon as the pressure on the stem 18 is removed.

Mounted on the tubular guide 15, between the T-fitting 14 and the perforated cap 16, is a forwardly extending arm 22, which furnishes a pivotal support 23 for the cam 24. The latter reaches back and rests freely on top of the stem 18, to continue from thence downward with an offset and curved extension 25, to pass by the side of the tubular guide 15 and below the tubular shaft 3.

From the free end of the curved extension 25, a cable 26 leads forward to an arm 27 on the cross shaft 28, which latter is suitably mounted in the chassis 29 of the automobile. The cross shaft 28 carries another arm 30 with a forwardly extending cable 31 at the end of said arm 30. Cross shaft and arm thus constituting a bell crank for the cables throughout the entire length of the shaft.

The cable 31 terminates in the vicinity of the foot pedal 32 (either brake or clutch pedal; for purpose of illustration, the former may be mentioned first), and is affixed to the lower end of a vertical lever 33, whose upper end is hingedly and also slidably suspended from a rail 34 on the fire board 35 of the automobile.

The forward apex of the brake pedal 32 is provided with a roller 36 to reduce friction, and touches against the middle portion of the hung lever 33. Thus, when the brake pedal 32 is depressed, the hung lever will occupy the position indicated by the dotted line 33 in Fig. 2, and the pressure will be transmitted as tension through the cables 31 and 26 to the curved extension 25. The latter, being part of the cam 24 pivoted at 23, the cam will exert a downward pressure on the stem 18, toward the dotted line 24 in Fig. 4, and drive the plunger into the ice. Since the leverage between the pivotal point 23 and the stem 18 is reduced as the cam 24 slides along the top of the stem 18 and approaches the position indicated by the dotted line 24, there is an appreciable gain in downward pressure as the plunger 17 enters deeper into the ice and greater pressure is needed.

However, it is neither desirable nor necessary that the plunger 17 should descend every time that the brake pedal 32 is used; particularly in summer time, or when no skidding need be apprehended. At such times the hung lever 33 can be shifted to one side and away from the break pedal 32. For that purpose a frame 37, as illustrated in Fig. 6, is pivoted to available parts of the automobile engine. The pivot 38 for the upper limb of the frame 37 can readily be arranged on the intake manifold 39 of the automobile engine. The pivot 40 for the lower limb of the frame 37 can best be obtained by attaching an angle bracket 41 to the steering column support 42 of the automobile. The upper limb of the frame 37 is bent to one side, as shown in Fig. 1, and engages with its bifurcated end 43' the hung lever 33 on the rail 34. When the end 43 of the lower limb of the frame 37 is pulled back, the entire frame 37 will act in the nature of a bell crank and, in occupying the position, indicated by the dotted line 37 in Fig. 1, carry the hung lever 33 to one side and away from the brake pedal 32.

To enable the motorist to turn the frame 37 quickly, and with the greatest convenience, there is a shift lever 44 near the driver's seat, suitably fulcrumed at 45 in the floor of the automobile. A rod 46 leads from the shift lever 44, above the fulcrum 45, to the end 43 of the lower limb of the frame 37. Thus, when the shift lever 44 is pulled into the vertical position, indicated by the dotted line 44, the rod 46 pushes the frame 37, and said frame throws the hung lever out of commission. A suitably notched plate 47, in the floor board of the automobile, holds the shift lever 44 securely in backward or forward position.

The shift lever 44 has yet one more function, and that is, to swing the plunger 17 of the ice brake from a vertical into a horizontal position, indicated by the dotted line 17 in Fig. 2. However, all that is needed for that purpose, is a rod 48, extending from the lower end of the shift lever 44 to an arm 49 on the tubular shaft 3.

A chair 50, on the bracket 2, as shown plainly in Fig. 3, furnishes a secure back rest for the tubular guide 15, to prevent the same from bending backward or sideways under the strain of application.

In operation, during normal driving when no skidding is to be feared, the shift lever occupies a vertical position close to the driver's seat, and presents no obstacles to the fullest freedom of his movements. The hung lever is at one side of the brake pedal and entirely clear thereof. The plungers lie horizontally, giving full road clearance under the automobile. Since the cams turn with the plungers, the cables between the curved extensions and the appertaining bell crank are slackened and relieved of all strain.

However, if skidding is expected, or a slippery patch in the roadway suddenly encountered, the shift lever is quickly thrown forward. That rotates the frame so as to bring the hung lever before the brake pedal, and at the same time swings the plungers into a vertical position. The tubular guides rest securely in their chairs, and all the cables are under proper tension for immediate action. The moment that the automobile driver feels his machine skidding, he merely has to obey his natural impulses to step on the brake pedal. That drives the serrated ends of the plungers into the ground, and retards the forward momentum of the automobile at the same time. When the pressure on the brake pedal is removed, the helical spring in the tubular guide will restore plunger, stem, and cam automatically to normal position.

If, for some reason, this additional use of the brake pedal is not desired, it is very easy to dimension the frame so that the hung lever will be brought rather before the clutch pedal instead of the brake pedal. The effect, in so far as the anti skidding feature is concerned, will be exactly the same.

Also, if the ordinary brakes should get out of order, the ice brake can be used as an effective substitute, but as the roadway is apt to be somewhat damaged thereby, such a course is not recommended, except in emergencies.

Having thus described my invention, it will be seen that my objects have been accomplished and, though I have shown the preferred form of construction, I reserve to myself the right to make minor changes, providing I do not contravene the spirit and principle of my invention.

I claim:

In an antiskidding device, particularly for automobiles, the combination of vertical plungers, hingedly attached to the rear axle housing of an automobile, cams operatively connected with the plungers, a hung lever in front of a foot pedal of the automobile, and means between the hung lever and the cams to force the plungers into the ground upon depression of the foot pedal, with a shift lever adjacent to the driver's seat to remove the hung lever from the foot pedal and to swing the plungers into a horizontal position.

A. E. BRUFFEE.